United States Patent
He

(10) Patent No.: US 9,501,682 B1
(45) Date of Patent: Nov. 22, 2016

(54) METHOD OF, AND ARRANGEMENT FOR, READING TWO-DIMENSIONAL SYMBOLS BY TRANSLATING ENCODED SYMBOL CHARACTERS FROM A LOCAL, TO A GLOBAL, CHARACTER SET

(71) Applicant: SYMBOL TECHNOLOGIES, LLC, Lincolnshire, IL (US)

(72) Inventor: Duanfeng He, South Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/880,384

(22) Filed: Oct. 12, 2015

(51) Int. Cl.
  *G06F 17/00* (2006.01)
  *G06K 7/14* (2006.01)
  *G06K 19/06* (2006.01)

(52) U.S. Cl.
  CPC .......... *G06K 7/1443* (2013.01); *G06K 7/1417* (2013.01); *G06K 19/06037* (2013.01); *G06K 19/06131* (2013.01); *G06F 17/00* (2013.01)

(58) Field of Classification Search
  CPC combination set(s) only.
  See application file for complete search history.

(56) References Cited

U.S. PATENT DOCUMENTS

| 7,347,373 B2* | 3/2008 | Singh | G06K 7/14 235/462.01 |
| 9,135,539 B1* | 9/2015 | Nemeth | G06K 15/181 |
| 2004/0268306 A1* | 12/2004 | Cheng | G06F 17/2247 717/114 |
| 2007/0214214 A1* | 9/2007 | Kawakura | G06F 17/275 709/203 |
| 2016/0103690 A1* | 4/2016 | Kim | G09F 25/00 704/8 |

* cited by examiner

*Primary Examiner* — Christle I Marshall

(57) ABSTRACT

An imaging reader is operatively connected to a host system and captures light returning from a two-dimensional symbol having encoded characters, and processes the captured light into binary data. A controller in the reader or the host system determines from the binary data if the encoded characters are encoded in accordance with a local character set that is indicative of a local language, and translates the local character set to a global character set that is indicative of multiple global languages after determining that the encoded characters are encoded in accordance with the local character set. The encoded characters are processed by the host system controller in accordance with the global character set.

20 Claims, 5 Drawing Sheets

METHOD OF, AND ARRANGEMENT FOR, READING TWO-DIMENSIONAL SYMBOLS BY TRANSLATING ENCODED SYMBOL CHARACTERS FROM A LOCAL, TO A GLOBAL, CHARACTER SET

BACKGROUND OF THE INVENTION

The present disclosure relates generally to a method of, and an arrangement for, electro-optically reading, by image capture, two-dimensional symbols having characters encoded with an encoding scheme, with an imaging reader operatively connected to a host system, and, more particularly, to insuring that the host system processes the characters using a compatible encoding scheme.

Solid-state imaging systems or imaging readers have been used, in both handheld and/or hands-free modes of operation, to electro-optically read, by image capture, two-dimensional bar code symbols having encoded characters to be decoded into binary data that is indicative of the encoded characters. A known imaging reader captures light scattered and/or reflected from the symbol, converts and processes the captured light into the binary data, and transmits the binary data to a remote host system for further processing, e.g., information retrieval from an information database.

The encoded characters of each symbol may be encoded with a local character set that is indicative of a local language, e.g., English, Chinese, Japanese, Korean, Hebrew, etc. A character set is a collection of characters, e.g., letters, numbers, punctuation marks, symbols, etc., that are used to represent and support a local language, or a set of languages that share a common writing system. In order for controllers, e.g., programmed microprocessors, in imaging readers and host systems, as well as computers in general, to sort, store, print, display, and process characters, the characters must be represented by numeric values. An encoding scheme, also called a codepage, is an organized table in which a numeric index, also known as a code point value, is assigned to each character in a certain order, thereby allowing a character to be distinctively identified by its corresponding code point value. Since various languages or language groups use characters, e.g., accented or entirely new letters, which other languages or groups do not use, different languages have their own different character sets or different local codepages that support them. Since some languages, such as English, French, German, Italian and Spanish, require less than 256 characters, they can be represented by a single byte (8 bits), also known as a single-byte character set (SBCS). Some Asian languages that use ideographic characters, such as Chinese (traditional and simplified), Japanese, and Korean, have many thousands of characters, and they can each be represented by two bytes (16 bits), also known as a double-byte character set (DBCS), or by multiple bytes having a variable number of bytes per character, also known as a multi-byte character set (MBCS).

The encoded characters of each symbol may also be encoded with a global character set, i.e., Unicode, which is indicative of multiple languages. Unicode is an open character set maintained as a computing industry standard by the Unicode Consortium and has a repertoire of more than 120,000 characters that includes substantially all of the world's writing systems. Unicode essentially unifies and internationalizes all of the local codepages and local character sets into a single, master character set or global codepage. One character encoding format capable of encoding all the possible characters in Unicode is the Universal coded character set+Transformation Format-8-bit (UTF-8), which has a variable length and uses 8-bit code units.

By international convention standard, the imaging readers transmit their binary data to a host system controller in accordance with the encoding scheme of each symbol in which its characters were encoded. The identity of the particular encoding scheme that was used to encode each symbol is not output from the imaging readers. In addition, the host system controller usually interprets the binary data from the imaging reader using the local codepage. For example, a host system controller operating in the United States would use the local codepage for English, whereas a host system controller operating in Japan would use the local codepage for Japanese. If the encoding scheme of the binary data matches that which the host system controller uses, then the further processing of the symbol is performed smoothly and accurately. However, if there is no match or compatibility, then the processing performance suffers, and typically fails. Further complicating the situation is that in many countries, e.g., China, Japan and Korea (CJK), each symbol can have its characters encoded either in accordance with the respective country's local codepage, or in accordance with the global codepage, e.g., Unicode. It is often preferred to encode the symbols in accordance with a local codepage, rather than the global codepage, because using the local codepage is faster and more efficient than using the global codepage, and is often preferred for communicating with legacy applications that only were encoded for use with local codepages. In any event, it is not known which of these local or global codepages was used in encoding each symbol, because, as described above, the identity of the particular encoding scheme that was used to encode each symbol is not output from the imaging readers. When the encoding scheme that the host system controller wants to use does not match the unknown encoding scheme of the encoded characters of the symbol being read, then the symbol will not be correctly or accurately processed, if at all.

Accordingly, it would be desirable to insure compatibility between the controllers of the imaging readers and their host systems, and to insure that the encoded characters are correctly and accurately processed and interpreted.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
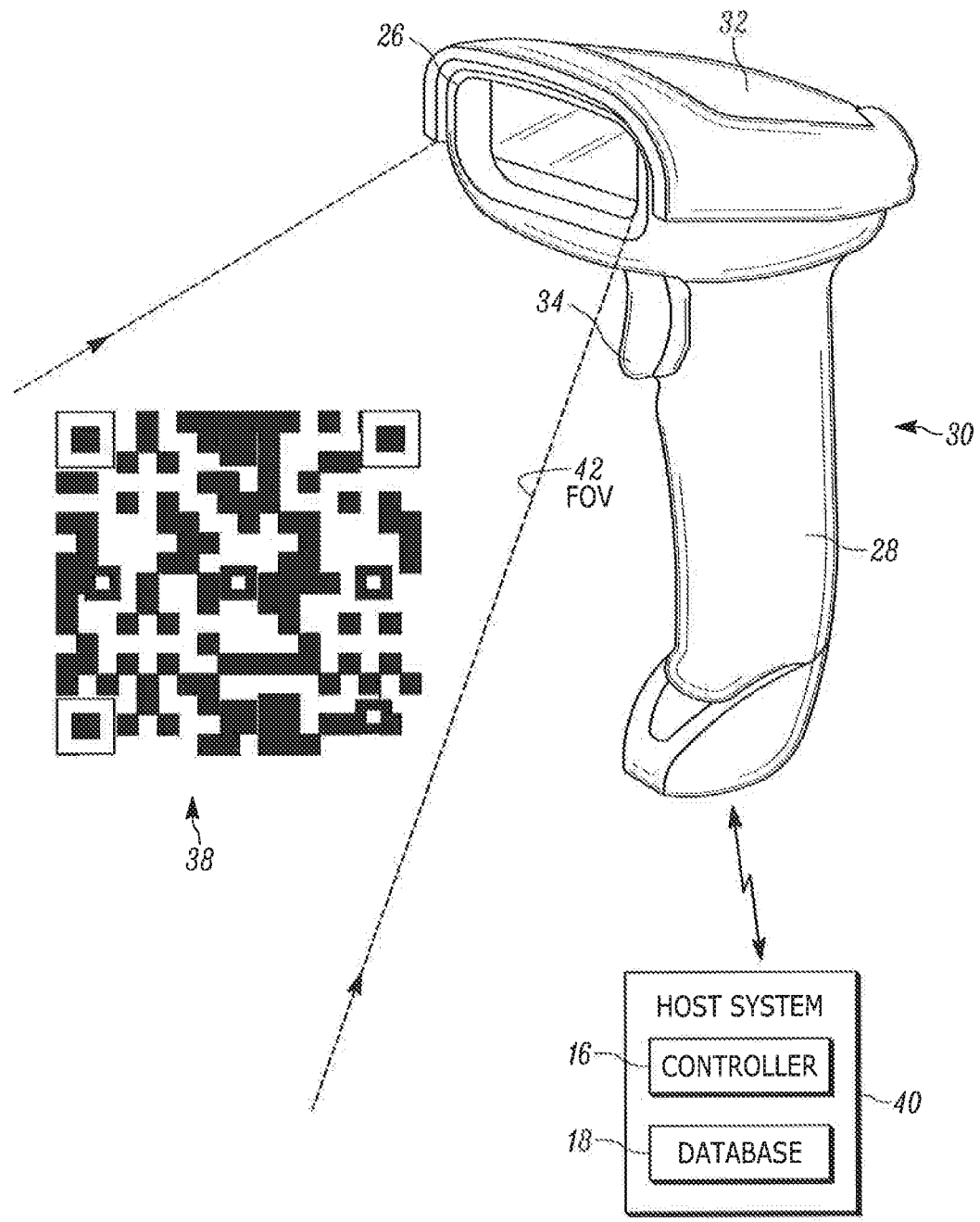
FIG. 1 is a perspective view of an arrangement for reading a two-dimensional symbol by image capture in accordance with this disclosure, and includes an electro-optical reader operatively connected to a remote host system.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and arrangement components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In accordance with one feature of this disclosure, a method of processing a two-dimensional symbol having encoded characters to be electro-optically read is performed by imaging the symbol with an imaging reader by capturing light returning from the symbol, and by processing the captured light into binary data. The method determines from the binary data if the encoded characters are encoded in accordance with a local character set that is indicative of a local language, and translates, preferably automatically, the local character set to a global character set that is indicative of multiple global languages after determining that the encoded characters are indeed encoded in accordance with the local character set. The encoded characters are processed with a host system controller, e.g., a programmed microprocessor, in accordance with the global character set. The determining and the translating of the local character set can be performed by a controller, e.g., a programmed microprocessor, in the imaging reader, or by the host system controller. The determining of the local character set may be performed in various ways. For example, a mode of the symbol may be analyzed, and/or other local character sets may be excluded, and/or most probable characteristic features of the local character set may be recognized. If the determining of the local character set is not successfully performed, then a default local character set may be set, which is then translated, as described above.

In accordance with another feature of this disclosure, an arrangement for processing a two-dimensional symbol having encoded characters to be electro-optically read, includes an imaging reader operatively connected to a host system. The reader captures light returning from the symbol, and processes the captured light into binary data. Either a controller in the imaging reader, or a controller in the host system, is operative for determining from the binary data if the encoded characters are encoded in accordance with a local character set that is indicative of a local language, and for translating the local character set to a global character set that is indicative of multiple global languages after determining that the encoded characters are indeed encoded in accordance with the local character set. The host system controller processes the translated characters in accordance with the global character set.

Turning now to the drawings, reference numeral 30 in FIG. 1 generally identifies an ergonomic, electro-optical imaging reader configured as a gun-shaped housing having an upper barrel or body 32 and a lower handle 28 tilted away from the body 32. A light-transmissive window 26 is located adjacent the front or nose of the body 32. The reader 30 is held in an operator's hand and used in a handheld mode in which a trigger 34 is manually depressed to initiate reading of targets, especially two-dimensional bar code symbols 38 having encoded characters, in a range of working distances relative to the window 26. The reader 30 is operatively connected, either by a wired or wireless link, to a remote host system 40 having a controller 16, e.g., a programmed microprocessor, and a database 18, the operation of the system 40 being described in detail below.

Although the symbol 38 illustrated in FIG. 1 has been shown as a Quick Response (QR) code, it will be understood that many other two-dimensional, or matrix codes, such as PDF417, DataMatrix, MaxiCode, etc., may be read by the reader 30. In addition, although the housing of the reader 30 has been shown as gun-shaped, this is merely exemplary, because housings of many other configurations and types can also be employed. For example, the housing need not be handheld, but can be supported by a base or cradle for supporting the reader on a countertop or like support surface, in which case, the reader can be used in a hands-free mode as a stationary workstation in which symbols 38 are slid or swiped past, or presented to, the window 26. As other examples, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows. In addition, the present disclosure can be incorporated in a scan engine or module, which is mounted within a housing, typically a sealed enclosure, of an apparatus, such as a hand-held mobile computer.

Figure 2:
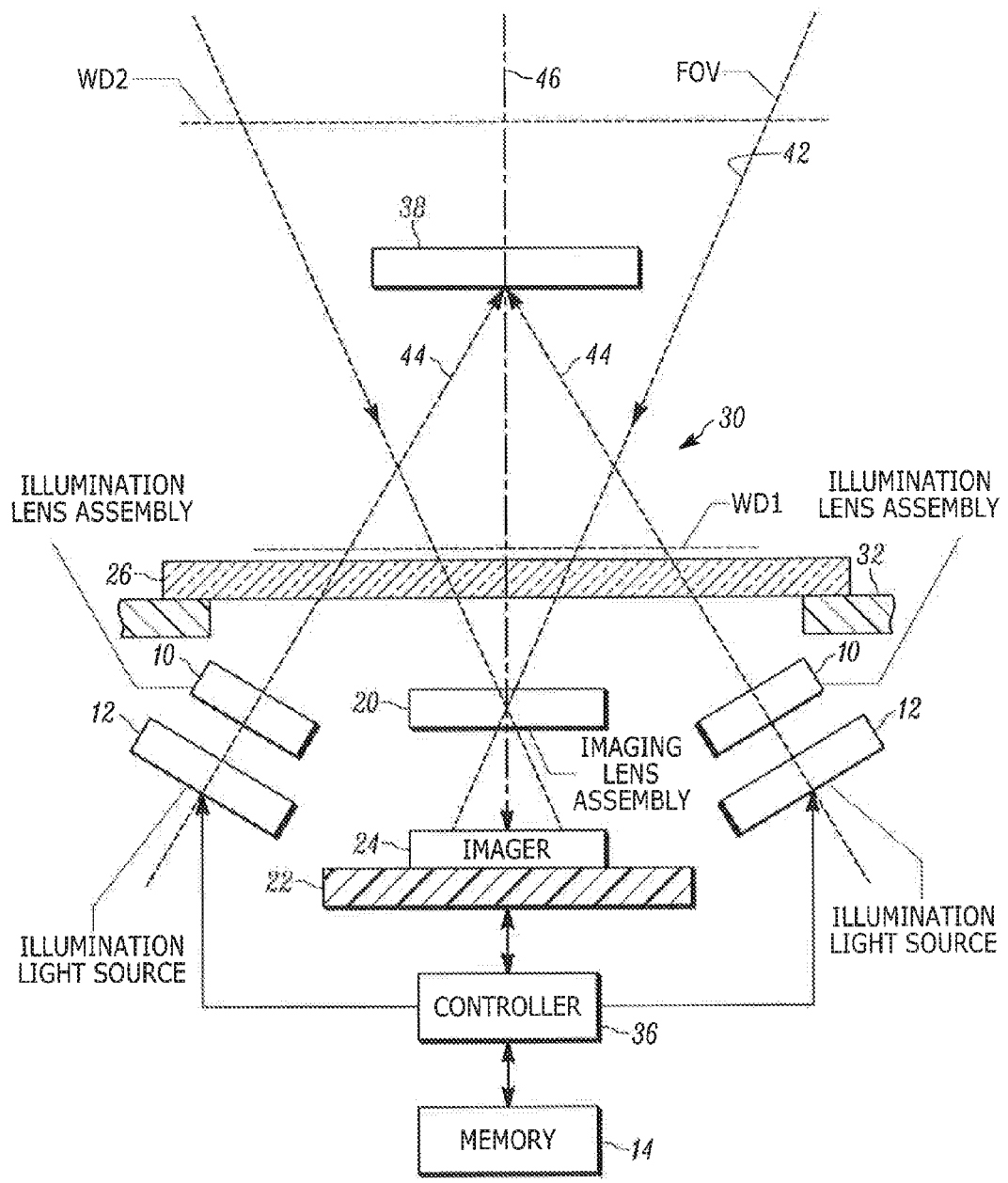
FIG. 2 is a schematic view of various electrical and optical components in the reader of FIG. 1.

As schematically shown in FIG. 2, an illuminating light source, e.g., one or more light emitting diodes (LEDs) 12, is mounted in the imaging reader 30. Each LED 12 is operative for illuminating the symbol 38 by emitting illumination light over an illumination angle centered on an illumination axis 44 toward the symbol 38 for reflection and scattering therefrom. Each LED 12 is provided with an illumination lens assembly 10 to uniformly and efficiently illuminate the target 38 with an illuminating light pattern.

An imager 24 is mounted on a printed circuit board 22 in the reader 30. The imager 24 is a solid-state device, for example, a charge coupled device (CCD) or a complementary metal oxide semiconductor (CMOS) device. The imager 24 has a two-dimensional array of addressable image sensors or pixels arranged in mutually orthogonal rows and columns, and is operative for detecting illumination and/or ambient light that is returning from the symbol 38 through the window 26, and that is captured by an imaging lens assembly 20 over an imaging field of view (FOV) 42 centered on an optical path or imaging axis 46. The imaging lens assembly 20 is operative for adjustably focusing and projecting the return light onto the array of image sensors to enable the symbol 38 to be read. The symbol 38 may be located anywhere in a working range of distances between a close-in working distance (WD1) located closely adjacent the window 26, and a far-out working distance (WD2) located remotely away from the window 26.

As also shown in FIG. 2, the imager 24 and the illumination LEDs 12 are operatively connected to a reader controller 36, e.g., a programmed microprocessor, operative for controlling the operation of these components. A memory 14 is connected and accessible to the controller 36. Preferably, the reader controller 36 is the same as the one used for processing the return light from the symbol 38 into a string of decoded binary data that is indicative of the encoded characters of the symbol 38 being read, and for transmitting the decoded binary data to the remote host system controller 16 for further processing, e.g., information retrieval from the database 18. In operation, the reader controller 36 sends a command signal to pulse the illumination LEDs 12 for a short exposure time period, say 500 microseconds or less, and energizes and exposes the imager 24 to collect light, e.g., the illumination light and/or ambient light, from the symbol 38 only during said exposure time period. A typical array needs about 18-33 milliseconds to acquire the entire symbol image and operates at a frame rate of about 30-60 frames per second.

As described above, the encoded characters of each symbol 38 may be encoded with a local character set or local codepage that is indicative of a local language, e.g., English, Chinese, Japanese, Korean, Hebrew, etc., or may be encoded with a global character set or global codepage, i.e., Unicode, that is indicative of multiple languages. In some countries, e.g., China, Japan, and Korea, either the local or the global codepage may be used to encode each symbol 38. Furthermore, it is not known which of these local or global codepages was used in encoding each symbol 38, because, as described above, the identity of the particular encoding scheme that was used to encode each symbol 38 is often not encoded in the data stored in the symbol 38, and thus not output from the imaging readers by industry convention standard. When the encoding scheme that the host system controller 16 wants to use does not match the unknown encoding scheme of the characters of the symbol 38 being read, the symbol 38 will not be correctly or accurately processed, if at all. One aspect of this disclosure is to insure compatibility between the reader controller 36 and its host system controller 16, and to insure that the host system controller 16 correctly and accurately processes and interprets the encoded characters.

Figure 3:
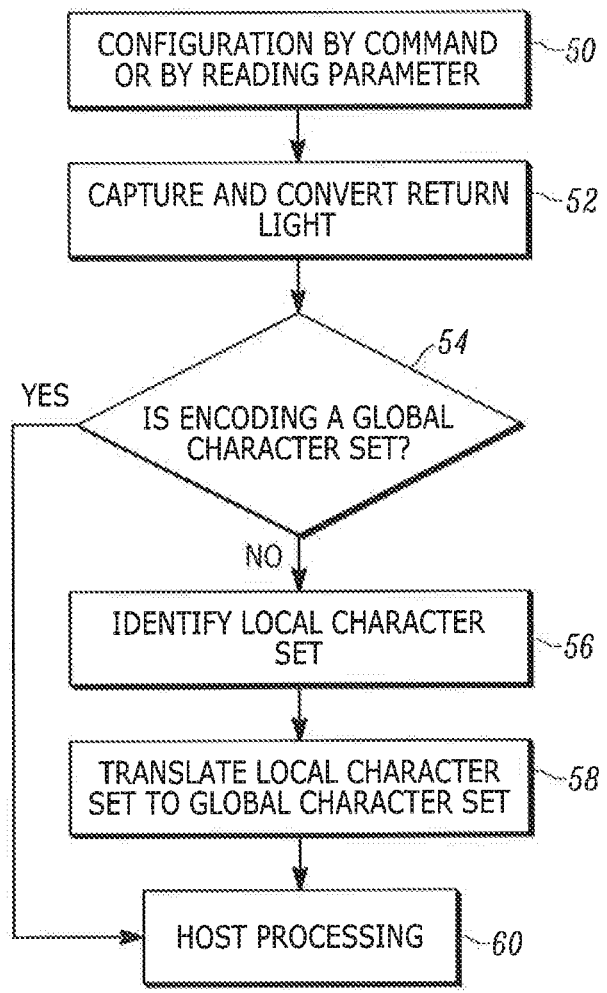
FIG. 3 is a flow chart depicting steps performed in accordance with a method of reading a two-dimensional symbol by image capture in accordance with this disclosure.

To that end, as shown in the flow chart of FIG. 3, the reader 30 or the host system 40 is initially instructed and configured in step 50 to perform a translation, as described in detail below. Upon actuation of the trigger 34, the imager 24 and the imaging lens assembly 20, under the control of the reader controller 36, capture and process the return light from the symbol 38 into decoded binary data that is indicative of the encoded characters in the symbol 38 in step 52. In one embodiment, in step 54, the reader controller 36 determines from the binary data whether the encoded characters represent a global character set that is indicative of multiple global languages, such as Unicode. In another embodiment, in step 54, the reader controller 36 transmits the binary data to the host system controller 16, and the host system controller 16 determines from the binary data whether the encoded characters represent a global character set that is indicative of multiple global languages, such as Unicode. If a global character set has been determined, then the host system 40, which processes a global character set by default, processes the encoded characters in step 60. If a global character set has not been determined, then the encoded characters represent a local character set that is indicative of a local language, and the specific local character set is identified by either the reader controller 36 or by the host system controller 16 in step 56. Next, the identified local character set is translated by either the reader controller 36 or by the host system controller 16 to the global character set in step 58. The translated characters are then processed by the host system controller 16 in step 60.

As mentioned above, the reader 30 or the host system 40 was initially instructed in step 50 to perform the translation in step 58. This instruction could have been preprogrammed into the controllers 36, 16 during manufacture and assembly of the reader 30 or the host system 40, or, especially in the case of an existing installation, this instruction could originate upon receipt of a command from the host system controller 16, or upon a confirmation that a special configuration symbol, also known as a parameter symbol, has been read by the imaging reader 30, whereby the reader controller 36 is then self-configured to perform the translation in step 58 when a local character set has been identified. The translation is preferably automatically performed. Thus, no matter whether the encoded characters of the symbol 38 are encoded with a global or a local character set, the host system controller 16, which operates under the global character set by default, can compatibly and accurately process and interpret the encoded characters, because the encoded characters are either already encoded in, or have been translated into, the global character set.

There are various ways in which either controller 36 or 16 can determine, in steps 56 and 58, whether a local or a global character set has been used to encode the symbol 38 and, if a local character set is determined, to determine which specific local character set has been used. Some of these ways are depicted in the flow chart of FIG. 4, in which, starting from a start step 64, one way, as shown in step 66, is to determine the mode in which the symbol 38 has been encoded. In the case of a QR code, the QR code uses several standardized encoding input character sets or modes (numeric, alphanumeric, byte/binary, extended channel interpretation (ECI), Kanji (Chinese characters in Japanese), Chinese, etc.) to efficiently store data, which are known to the reader controller 36, but are not transmitted to the host system controller 16, by industry standard. As shown in the flow chart of FIG. 5, controller 36 determines the mode by first checking whether a binary mode was used in step 80 and, if so, then the local codepage is unknown. If not, controller 36 then checks whether a Chinese mode, but not a Kanji mode, was used in step 82 and, if so, then the local codepage is Chinese. If not, controller 36 then checks whether a Kanji mode, but not a Chinese mode, was used in step 84 and, if so, then the local codepage is Japanese. If not, then the local codepage is unknown.

Figure 4:
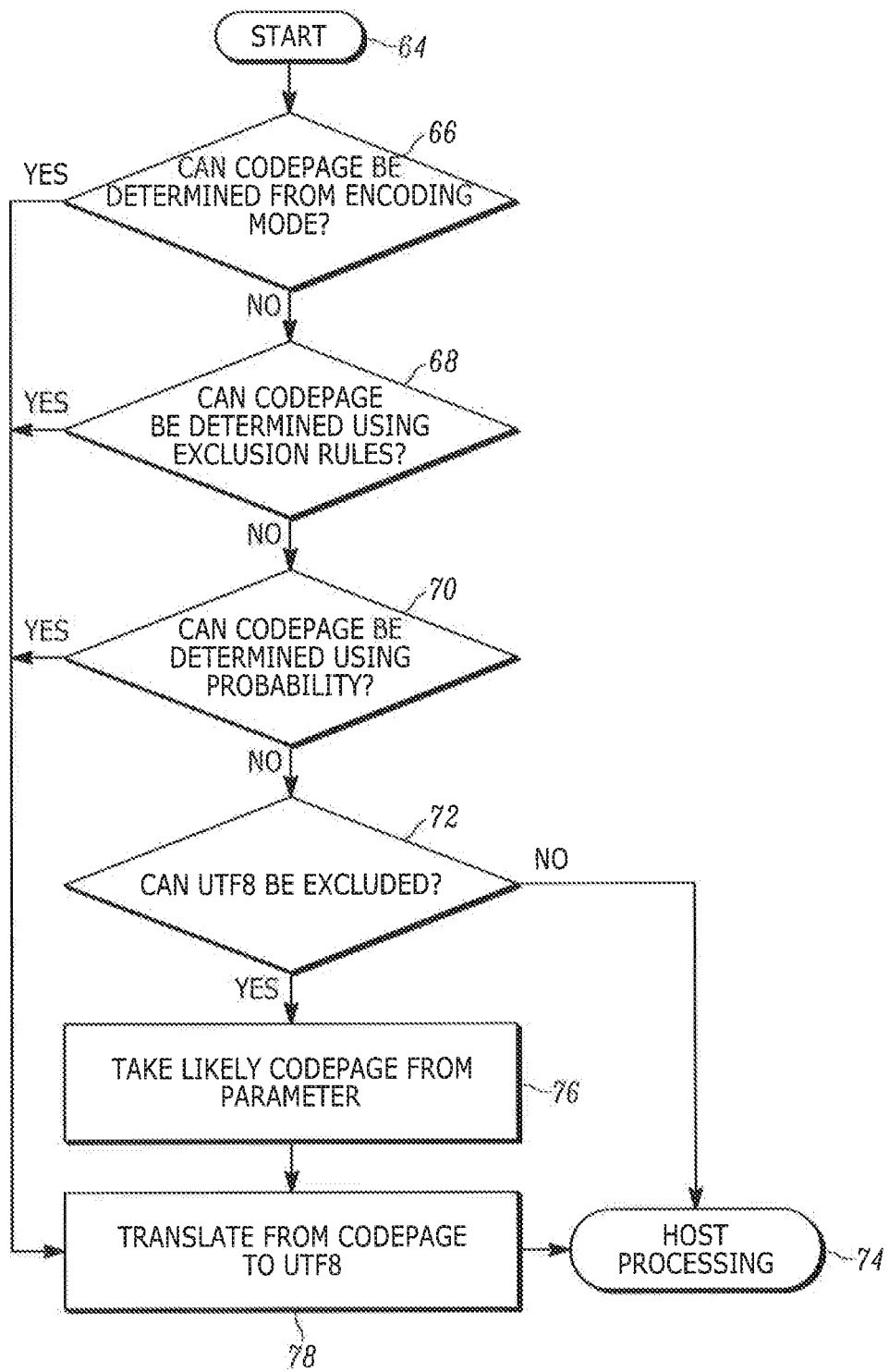
FIG. 4 is a flow chart depicting steps performed in determining a local codepage.
Figure 5:
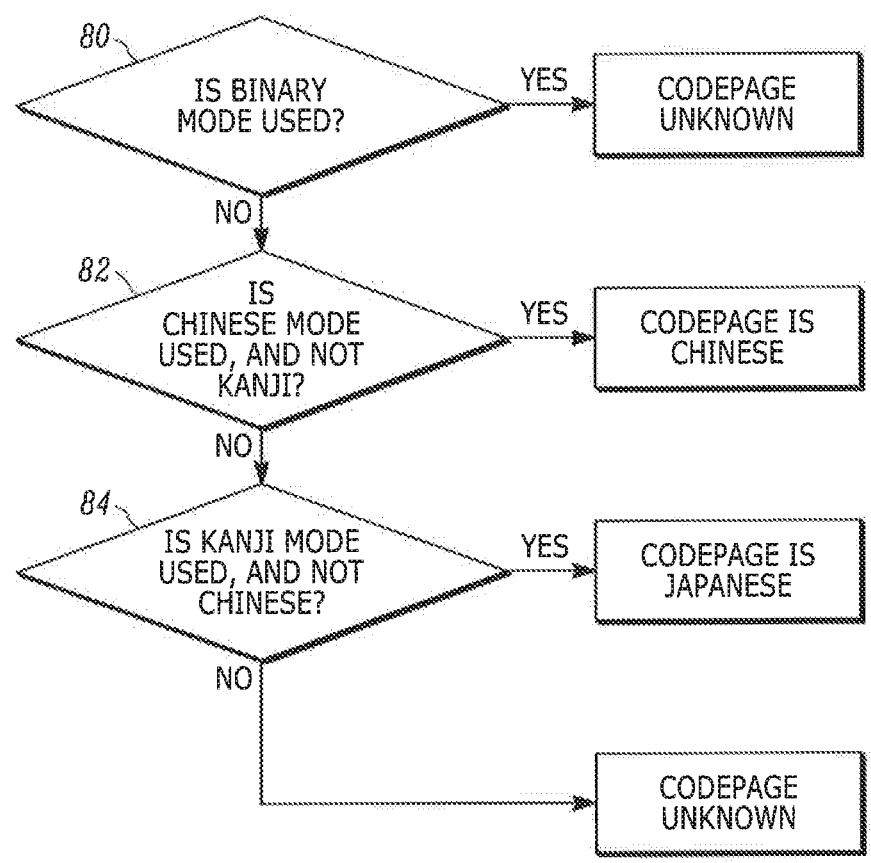
FIG. 5 is a flow chart depicting steps performed in determining a local codepage by determining a mode in which the symbol was encoded.

Turning again to the flow chart of FIG. 4, if the local codepage was determined in step 66, then the binary data is translated into the global codepage and converted into the UTF-8 output format for Unicode in step 78 prior to the translated characters being processed by the host system controller 16 in step 74. If the local codepage was not determined in step 66, then either controller 36 or 16 then checks whether the local codepage can be determined by using exclusion rules in step 68, i.e., by excluding other local character sets. Each local codepage has code points, which are unique byte sequences that are not used, and, if such non-used code points are found, then these non-used code points can be relied on to exclude a local codepage. If the local codepage was determined in step 68, then the binary data is translated into the global codepage and converted into the UTF-8 output format for Unicode in step 78 prior to the translated characters being processed by the host system controller 16 in step 74.

If the local codepage was not determined in step 68, then either controller 36 or 16 then checks whether the local codepage can be determined by relying on probabilities in step 70, i.e., by recognizing a particular local codepage because it is more probable than any other local codepage. Either controller 36 or 16 checks the binary data to see how frequently certain characters are present, and, if there is a high frequency of certain characters that belong to a specific local codepage, then that local codepage is determined to be the most probable local codepage. Conversely, if there is a number of unlikely characters from a codepage, or an unlikely combination of characters from a codepage, then it is less probable that this is the correct codepage. If the local codepage was determined in step 70, then the binary data is translated into the global codepage and converted into the UTF-8 output format for Unicode in step 78 prior to the translated characters being processed by the host system controller 16 in step 74.

If the local codepage was not determined in step 70, then either controller 36 or 16 then checks whether the global codepage can be excluded in step 72. If not, then the binary data is already encoded as a global codepage in the UTF-8 output format for Unicode and is processed by the host system controller 16 in step 74. If the global codepage can be excluded, then the binary data is encoded as an unknown local codepage, in which event, either controller 36 or 16 then assigns a specific local codepage by default in step 76. The default local codepage is typically set by the geographic location of the host system 16. Either controller 36 or 16 then translates the binary data of the local codepage that has been set by default, and converts it into the UTF-8 output format for Unicode in step 78 prior to the translated characters being processed by the host system controller 16 in step 74. The steps 66, 68 and 70 need not be performed consecutively in the order shown in FIG. 4, because any one or more of the steps can be performed in any order in a particular application.

In many situations, it is preferred that the host system controller 16 perform the translation, because the host system 40 already has the necessary database and is already configured to translate between the different encoding schemes present on the Internet, for example. Some web pages are encoded in local codepages, while others are encoded in the global codepage. Also, the host system controller 16 typically already has locale or location information. Locale information is set by a user when the user declares the local time zone, monetary unit, numerical display format (whether to use a point or a comma for decimal separator, e.g.), etc. Location information is usually gotten from a global positioning system (GPS) or from a cellular system.

Sometimes, it is preferred that the reader controller 36 perform the translation, because some users want the reader 30 to be independent of the host system 40, and not to require any change to the host system 40. This typically occurs when the reader 30 interacts as a peripheral device attached to a cash register.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or arrangement that comprises, has, includes, contains a list of elements does not include only those elements, but may include other elements not expressly listed or inherent to such process, method, article, or arrangement. An element proceeded by "comprises . . . a," "has . . . a," "includes . . . a," or "contains . . . a," does not, without more constraints, preclude the existence of additional identical elements in the process, method, article, or arrangement that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or arrangement described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of processing a two-dimensional symbol having encoded characters to be electro-optically read, comprising:
    imaging the symbol with an imaging reader by capturing light returning from the symbol, and by processing the captured light into binary data;
    determining from the binary data if the encoded characters are encoded in accordance with a local character set that is indicative of a local language;
    translating the local character set to a global character set that is indicative of multiple global languages after determining that the encoded characters are encoded in accordance with the local character set; and
    processing the translated characters in accordance with the global character set.

2. The method of claim 1, wherein the imaging is performed by projecting the captured light onto a solid-state, two-dimensional array of image sensors.

3. The method of claim 1, wherein the determining of the local character set is performed by analyzing a mode of the symbol.

4. The method of claim 1, wherein the determining of the local character set is performed by excluding other local character sets.

5. The method of claim 1, wherein the determining of the local character set is performed by analyzing most probable code points of the local character set.

6. The method of claim 1, and setting a default local character set when the determining of the local character set is not successfully performed.

7. The method of claim 1, wherein the translating is performed automatically after determining the local character set.

8. The method of claim 1, wherein the determining and the translating are performed by a controller in the imaging reader, and further comprising transmitting the translated characters to a controller of a host system, and wherein the host system controller processes the translated characters in accordance with the global character set.

9. The method of claim 1, and further comprising transmitting the binary data to a controller of a host system, wherein the determining and the translating are performed by a controller in the host system, and wherein the host system controller processes the translated characters in accordance with the global character set.

10. The method of claim 1, wherein the translating is performed in response to one of a command from the host system controller, and a confirmation that a self-configuring parameter symbol has been read by the reader.

11. An arrangement for processing a two-dimensional symbol having encoded characters to be electro-optically read, comprising:
    an imaging reader for capturing light returning from the symbol, and for processing the captured light into binary data;
    a host system operatively connected to the imaging reader; and
    a controller in one of the imaging reader and the host system, for determining from the binary data if the encoded characters are encoded in accordance with a local character set that is indicative of a local language, and for translating the local character set to a global character set that is indicative of multiple global languages after determining that the encoded characters are encoded in accordance with the local character set, the controller in the host system being operative for processing the translated characters in accordance with the global character set.

12. The arrangement of claim 11, wherein the imaging reader includes a solid-state, two-dimensional array of image sensors, and an imaging lens assembly for projecting the captured light onto the array.

13. The arrangement of claim 11, wherein the controller in the one of the imaging reader and the host system is further operative for analyzing a mode of the symbol.

14. The arrangement of claim 11, wherein the controller in the one of the imaging reader and the host system is further operative for excluding other local character sets.

15. The arrangement of claim 11, wherein the controller in the one of the imaging reader and the host system is further operative for analyzing most probable code points of the local character set.

16. The arrangement of claim 11, wherein the controller in the one of the imaging reader and the host system is further operative for setting a default local character set when the local character set is not successfully performed.

17. The arrangement of claim 11, wherein the controller in the one of the imaging reader and the host system automatically performs the translation after determining the local character set.

18. The arrangement of claim 11, wherein the controller in the imaging reader performs the translation and transmits the translated characters to the controller of the host system, and wherein the host system controller processes the translated characters in accordance with the global character set.

19. The arrangement of claim 11, wherein the controller in the imaging reader transmits the binary data to the host system controller, and wherein the controller in the host system performs the translation and processes the translated characters in accordance with the global character set.

20. The arrangement of claim 11, wherein the controller in the one of the imaging reader and the host system is operative for translating the local character set in response to one of a receipt of a command from the host system controller, and a confirmation that a self-configuring parameter symbol has been read by the reader.

* * * * *